Patented Oct. 22, 1935

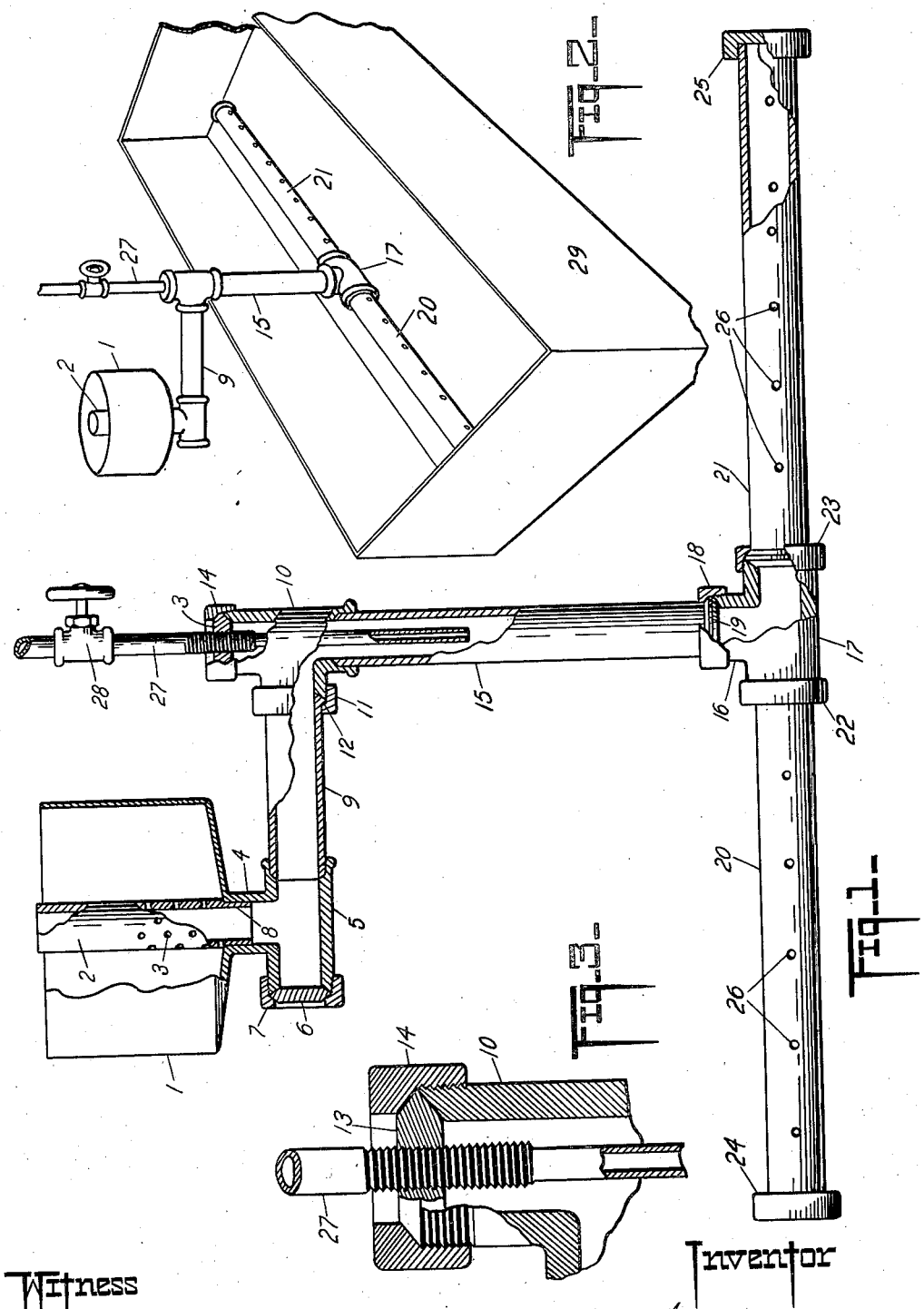

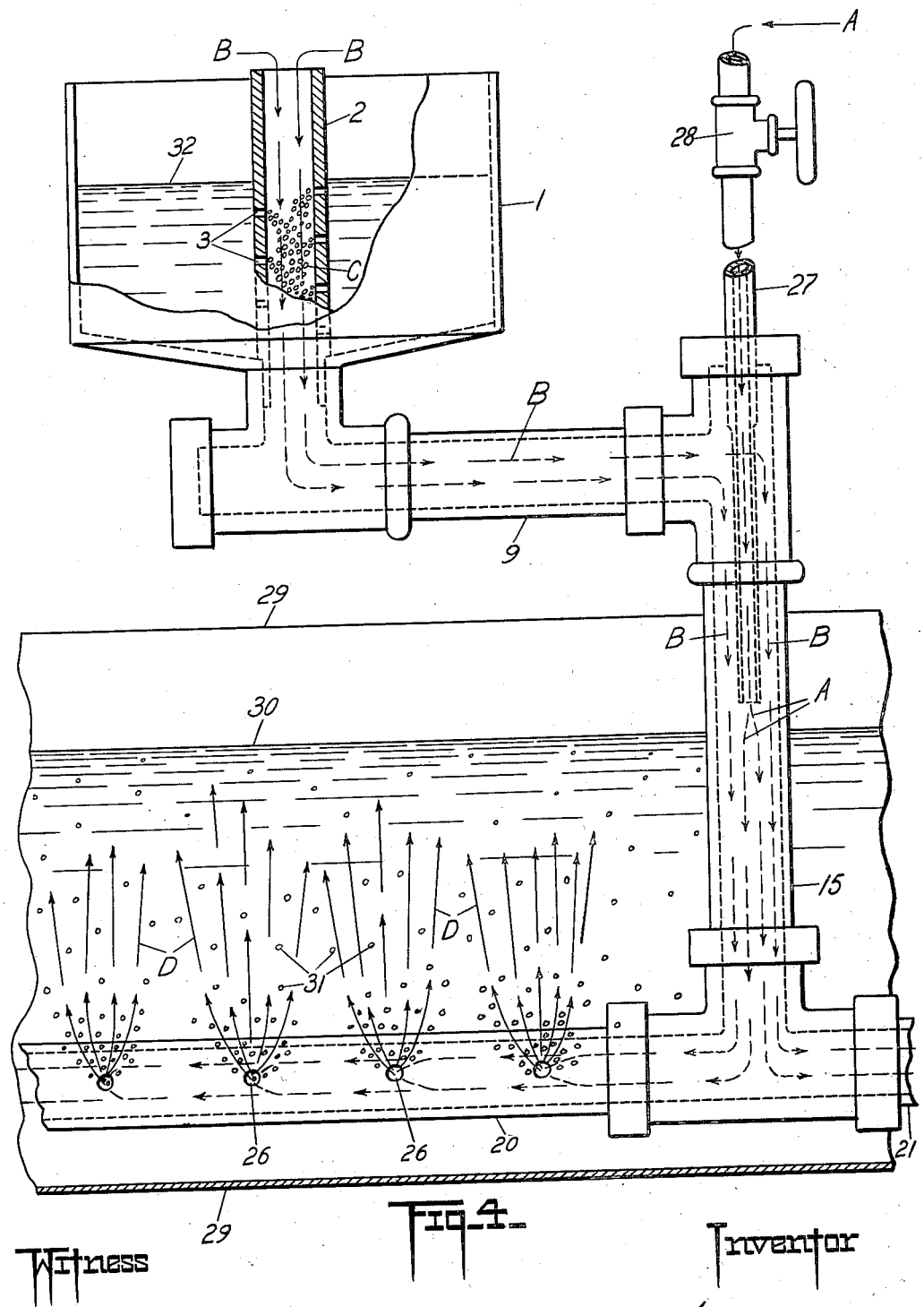

2,018,173

UNITED STATES PATENT OFFICE 2,018,173

DEVICE FOR APPLYING NEUTRALIZERS TO SOUR CREAM

Charley Jorgensen, Springfield, Mo.

Application January 10, 1935, Serial No. 1,169

6 Claims. (Cl. 31—2)

My invention relates to a device for applying neutralizers to sour cream.

For a better understanding and appreciation of the advantages of my device I deem it advisable to explain briefly the problems pertaining to the handling of sour cream preparatory to pasteurization. Churning excessively sour cream results in considerable loss of butterfat, undesirable flavors and poor keeping quality of the butter. Remedial measures comprise reducing the acidity of the cream with a neutralizer before pasteurization. It will be noted that the term "neutralization" as used by the butter industry does not mean the removal of all the acid in the cream as the term would ordinarily imply, but means the reduction of the acid content to the desired percentage, which is generally accepted as approximately .25%. As great as are the benefits to be derived from proper neutralization, so are also disastrous the results of over-neutralization, principal of which is the loss of butterfat. Neutralizers used, obviously must be alkalies or alkaline earths or their carbonates. Those most commonly employed are the carbonates of sodium and of calcium, the bicarbonate of soda, the hydrate of soda, and of calcium, and the oxide of calcium and of magnesium.

The choice of agent to use is arbitrary, each having its advantages and disadvantages, but the chief problem lies in the application of the neutralizer to the cream. Improper application of a correct neutralizer will cause as serious damage to the cream as will overneutralization or underneutralization and it is with this phase that my invention relates.

It is known that the neutralizer should be distributed as evenly as possible throughout the entire volume of the cream and without subjecting any particular portion of the cream to an excess of neutralizer inasmuch as this would cause an excessive combination of the neutralizer with the curd content of the cream due to the fact that the curd of sour cream has a greater affinity for the alkalizer than has the lactic acid of the serum, causing the curd to precipitate in lumps carrying with it considerable fat and resulting in a loss of this fat content. It is readily seen that dumping or pouring the neutralizer into the cream would be disastrous and it is further obvious that any method that allows the neutralizer to come in contact with the cream while the neutralizer is in drops or streams is likewise not efficient inasmuch as that the particular portion of cream immediately surrounding the drop or stream of neutralizer would have its curd content overneutralized through direct contact before the drop or stream of neutralizer could spread to more remote portions of the cream, resulting in uneven neutralization and loss of butterfat content.

Prior to my invention the method employed by creameries in general has been to use a sprinkler to distribute the neutralizer over the surface of the cream while the latter is being agitated. The loss to the industry in butterfat, in the reduced quality of the butter, and in the lowering of the keeping qualities due to this method is enormous.

The object of my process and device is to overcome these difficulties and provide a method and means for mixing neutralizer with cream whereby the mixing will be uniform, thorough and systematic and that will result in a saving of butterfat and in the production of a better quality of butter.

By my method and through the use of my device the neutralizer is thoroughly vaporized and distributed to the cream at the bottom of the vat by air and steam. This vapor laden air forms bubbles which rise through the cream and in so doing subject the cream to the particles of neutralizer contained in the bubbles. In this manner a greater surface area of cream is subjected to the action of the neutralizer causing the neutralizer to be absorbed more evenly by the cream.

A further object of my method and device is to aerate the cream while it is being neutralized, thereby aiding in carrying away the volatile gases which form through the process of neutralization and which have undesirable odors, as well as helping to rid the cream of carbon dioxide gas which is liberated when any neutralizer containing carbonates is added to sour cream.

In detail my method consists of delivering, in jets, near the bottom of the vat of cream, steam with which has been incorporated air laden with vaporized neutralizer, and allowing the resulting bubbles to rise through the cream whereby the neutralizer is absorbed by the cream.

A further description of my device may be had by reference to the accompanying drawings in which Fig. 1 is a view in elevation, a part of which is in section (fragmentary), showing my device. Fig. 2 is a view in perspective showing how my device is intended to be located in a cream vat. Fig. 3 is a fragmentary view partly in section showing details of the steam jet and its relation to the air conduit. Fig. 4 is a fragmentary elevation showing how my device operates.

In more detail in Fig. 1, I is a container in which the liquid neutralizer is placed and concentrically located therein is a removable tube 2, having holes 3 through which the neutralizer in the container 1 may enter the tube 2 in jets. The container 1 is secured to the stem 4 of the T coupling 5 which is closed at one end by the disc 6 which is held in place by the screw collar 7. The smaller lower portion 8 of the tube 2 extends downward into the stem 4. The conduit 9 is secured to one end of the T coupling 5 (preferably by soldering) and is connected to the T coupling 10 by the screw collar 11 which engages the flange 12. The coupling 10 has a disc 13 at its upper end held in place by the screw collar 14. Attached to the lower end of the T coupling 10 (preferably by soldering) is a conduit 15 which is secured to the stem 16 of the T coupling 17 by the collar 18 engaging the flange 19. To the opposite ends of the straight portion of the T coupling 17 are secured conduits 20 and 21 by the collars 22 and 23. The outer ends of the conduits 20 and 21 are closed by caps 24 and 25. Holes are provided in the walls of the conduits at 26, 26. The disc 13 is provided with a centrally located threaded hole in which is screwed the threaded steam tube 27 through which steam may enter the conduit 15 when the valve 28 is opened.

In Fig. 2 the device is shown in position in a cream vat. As will be observed the conduits 20 and 21 together with the T coupling 17 may be turned, for convenience in operation, to any desired angle in a horizontal plane with reference to the rest of the device.

Fig. 3 shows in detail a portion of the coupling 10, together with the disc 13, the collar 14 and the steam tube 27.

In Fig. 4 is shown how the device operates. The device is here located in a vat 29 which contains cream 30. Steam under pressure enters the tube 27 through the valve 28, emitting from the lower end of the tube 27 as indicated by the arrows A, A. The downward movement of this steam forms a partial vacuum in the conduit 15 surrounding the steam tube 27, which draws air into the conduit 15 through the conduit 9 and the tube 2, as indicated by the arrows B, B. The steam and air are carried downward through conduit 15 and outwardly through conduits 20 and 21, escaping through the holes 26, 26 into the cream 30, where bubbles 31 are formed in the cream and move upward as indicated by the arrows D, D. As soon as the steam has been turned on and aeration of the cream has started, liquid neutralizer 32 is poured into the container 1 from where it enters the tube 2 through the openings 3 where the downward moving air at B, B breaks it up into drops C, C and partially atomizes it, carrying it through conduit 9 and downward in conduit 15 around the steam tube 27 to join the emitting steam, where it is more fully atomized and carried by the steam and air through conduits 20 and 21 and through the holes 26, 26 into the cream 30.

I claim:

1. A device for applying neutralizer to sour cream comprising a series of spray nozzles designed to be located within a vat of cream near the bottom thereof, means for conducting steam to said nozzles, means for mixing air with said steam and means for mixing neutralizer with said air.

2. A device for applying neutralizer to sour cream, said device comprising a means for atomizing neutralizer with air, and means for injecting said air into a body of cream near the bottom thereof.

3. A device for applying neutralizer to sour cream, said device comprising, in combination, a means for admixing steam and air, a means for injecting said mixture into the cream, and means for vaporizing and incorporating with said mixture a neutralizer.

4. A device for applying neutralizer to sour cream, said device comprising a neutralizer container having centrally located therein a vertical perforated tube, said tube having its upper end open and being interconnected at its lower end with a conduit, said conduit having a portion thereof perforated to form nozzles, said portion being designed to be placed within a vat of cream near the bottom thereof, and a steam nozzle located within said conduit intermediate said container and said spray portion and being designed to direct a jet of steam toward said spray portion, whereby a partial vacuum may be produced within said conduit to draw air thereinto through said vertical perforated tube and force it through the nozzles of said spray portion.

5. A device for applying neutralizer to sour cream, said device comprising, in combination, a neutralizer container, a series of spray nozzles, a conduit communicating with said spray nozzles, a vacuum producing steam nozzle within said conduit, said steam nozzle being designed to draw air into said conduit and force it through said spray nozzles, and interconnecting means whereby liquid neutralizer poured into said container may enter said conduit to admix with the air entering said conduit.

6. An apparatus for the purpose set forth and comprising a conduit, said conduit having a spray portion designed to be placed within a vat of cream, a neutralizer container, a neutralizer intake whereby the neutralizer may enter the conduit, an air intake whereby air may enter said conduit, said conduit having a mixing portion, and means within said mixing portion for drawing air and neutralizer into said conduit, mixing said air and neutralizer and forcing it out through said spray portion into the cream.

CHARLEY JORGENSEN.